ROTATIONAL MODE MEMORY CIRCUIT HAVING FLUX CLOSURE PATHS

Filed Nov. 3, 1964 Sheet 1 of 3

INVENTOR
A.H. BOBECK
BY Herbert M. Shapiro
ATTORNEY

United States Patent Office
3,428,956
Patented Feb. 18, 1969

3,428,956

ROTATIONAL MODE MEMORY CIRCUIT HAVING FLUX CLOSURE PATHS

Andrew H. Bobeck, Chatham, N.J., assignor to Bell Telephone Laboratories, Incorporated, New York, N.Y., a corporation of New York Filed Nov. 3, 1964, Ser. No. 408,520
U.S. Cl. 340—174 3 Claims
Int. Cl. G11b *5/00*

ABSTRACT OF THE DISCLOSURE

Continuous flux closure paths for flux switched between first and second directions along an easy axis of magnetization in an anisotropic magnetic film in a rotational mode of operation.

This invention relates to magnetic memories and, more particularly, to magnetic memories employing both magnetically retentive material and low reluctance material.

One well known structure of this type, commonly known as the waffle iron memory, is described in copending application Ser. No. 215,318, filed Aug. 7, 1962, for A. H. Bobeck and J. L. Smith, now United States patent 3,274,571. The waffle iron structure typically comprises a low reluctance base plate having a plurality of posts thereon and a magnetically retentive overlay. Drive currents applied to word and digit conductors threaded between the posts induce magnetomotive forces in the overlay for the storage of information there. The terms "low reluctance" and "magnetically retentive" are used herein in a manner consistent with the use of such terms in connection with conventional waffle iron memories.

Attempts to operate the waffle iron structure in the well known rotational mode have met with little success. In this connection, the rotational mode of operation requires a thin film of anisotropic magnetic material having a hard and an easy axis. Binary information is stored as first and second directions of flux along the easy axis. The writing of information into a selected bit location in this mode of operation requires a relatively large current pulse on a first associated conductor to switch flux in the selected bit location into the hard direction, and a tipping pulse, applied to a second associated conductor, to select the direction of flux along the easy axis when that first mentioned pulse terminates. Readout is accomplished by again switching flux to the hard direction and detecting the polarity of the voltage induced in the second conductor. Such a mode of operation is generally desirable because it provides relatively high switching speeds. It is a particularly interesting mode of operating a waffle iron structure because of the prospect of the relatively low drive currents typical of waffle iron memories.

A proposed partial explanation of the lack of success with the rotational mode of operation in a waffle iron structure is that when flux is rotated from a direction in which a closed flux path is provided through the posts therein high demagnetization fields are encountered. To overcome these fields, relatively high drive currents are required and the primary advantage of the waffle iron structure is lost to a considerable extent. Moreover, even when information is stored in response to relatively high amplitude drive currents, successive tipping currents have a seemingly unavoidable detrimental effect on information stored in nonselected locations. This detrimental effect is commonly termed the "walk-down effect" and is known to be directly proportional to demagnetization fields existing at bit locations exhibiting such an effect.

An object of this invention is to provide a new and novel waffle iron type structure which can be operated in the rotational mode.

A more specific object of this invention is to provide a waffle iron memory wherein high demagnetization fields are not encountered during flux rotation.

The foregoing and further objects of this invention are realized in one embodiment thereof wherein first and second low reluctance base plates, grooved to receive first and second sets of generally parallel drive conductors, respectively, are positioned, conductors inwardly, to sandwich therebetween an anisotropic "overlay." The low reluctance base plates provide, at each bit location, first and second independent flux closure paths for the flux induced by a current in selected first and second drive conductors, respectively. The structure of the low reluctance base plates provides uniform closed flux paths at all times during operation. Independent flux closure paths permit relatively low drive currents without "short circuiting" the retentive material; uniform closed flux paths permit rotational switching in the absence of impeding high demagnetization fields.

In another embodiment, a single low reluctance base plate having a unique arrangement of interleaved rows of posts includes a wiring arrangement which turns the unique arangement of posts to account in providing closed flux paths in the manner described.

Accordingly, a feature of this invention is a magnetic memory including low reluctance means for providing first and second independent flux closure paths for the flux induced in each bit location by a current in first and second drive conductors, respectively.

In accordance with an embodiment of this invention, a feature thereof is two low reluctance base plates, each housing a plurality of generally parallel conductors, sandwiching an anisotropic magnetic overlay therebetween.

In accordance with another embodiment of this invention, a feature thereof is a base plate having an arrangement of interleaved rows of posts and a wiring pattern to provide thereof first and second independent closed flux paths for the flux induced in a bit location by a current in first and second drive conductors, respectively.

The foregoing and further objects and features of this invention will be understood more fully with reference to the following description rendered in conjunction with the accompanying drawing, wherein.

Figure 1:
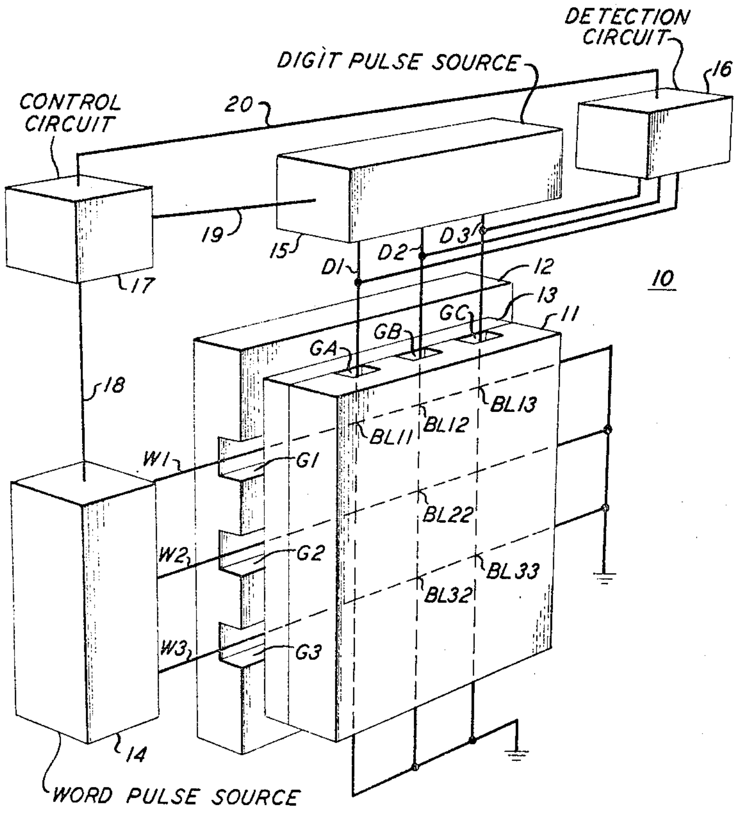
FIG. 1 is a schematic plan view of a memory in accordance with this invention.

FIG. 1 shows a word-organized memory 10 including two low reluctance base plates 11 and 12 sandwiching a magnetic overlay 13 therebetween. Overlay 13 is a sheet (film) of anisotropic material such as a permalloy comprising, illustratively, 80 percent nickel and 20 percent iron (by weight) having substantially rectangular hysteresis characteristics. Each base plate includes a plurality of grooves, illustratively three grooves each. The grooves in plate 11 are designated GA, GB, and GC. The grooves in plate 12 are designated G1, G2, and G3. As may be seen in the figure, the grooves are facing the overlay 13 and are arranged so that the grooves in one plate are orthogonal to those in the other. A plurality of word conductors, designated W1, W2, and W3, are connected at one end to a word pulse source 14, through the grooves G1, G2, and G3, respectively, to ground at the other end. Similarly, a plurality of digit conductors, designated D1, D2, and D3, are connected electrically in parallel between a digit pulse source 15 and a detection circuit 16 at one end, through grooves GA, GB, and GC, respectively, to ground at the other end. Word pulse source 14, digit pulse source 15, and detection circuitry 16 are connected to a control circuit 17 by conductors 18, 19, and 20, respectively. In this connection, pulse sources 14 and 15, detection circuit 16, and control circuit 17 may be any sources and circuits capable of operating in accordance with this invention.

Figure 2:
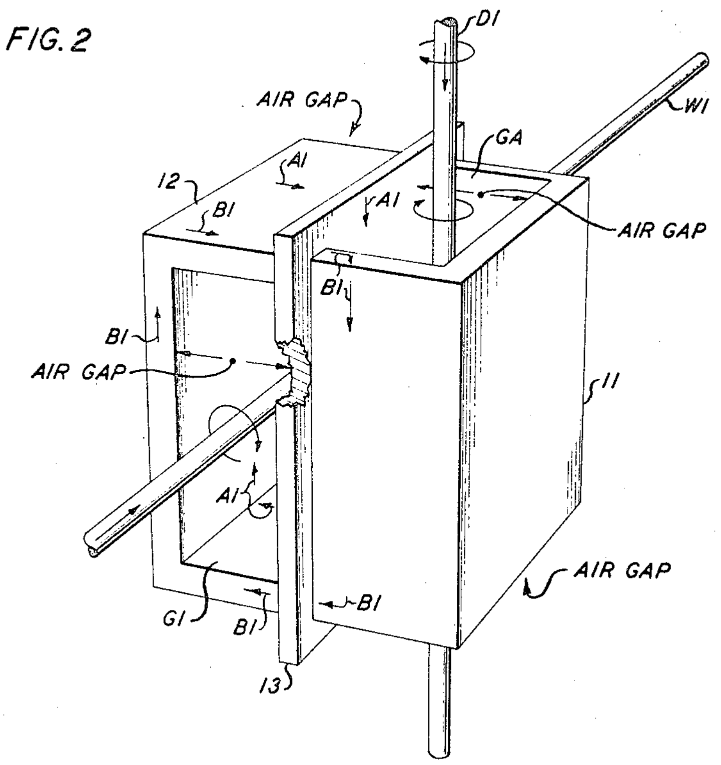
FIG. 2 is an enlarged schematic plan view of a portion of the memory of FIG. 1 taken at a bit location thereof.

It may be noticed from FIG. 1 that the conductors W1, W2, and W3, and the conductors D1, D2, and D3 form a matrix of intersections which define in the overlay 13 therebetween a matrix of bit locations. The bit locations are designated BL and each such designation is followed by numerals corresponding to the numerals of the word and digit conductors defining it. Thus, BL11 is defined by word conductor W1 and digit conductor D1; BL32 is defined by word conductor W3 and digit conductor D2. The portion of memory 10 about a representative bit location BL11 is shown in FIG. 2. The reference numerals and letters used in FIG. 2 correspond to those used in FIG. 1.

It is helpful in understanding the operation of a memory in accordance with this invention first to understand the flux patterns which may exist in a bit location of the memory during that operation and the fields associated with the drive currents for causing those flux patterns. Accordingly, the storage and read out of binary values "1" and "0" will be discussed in connection with a representative bit location BL11 along with the drive currents and their associated fields. Then the discussion will be extended to the storage and read out of an illustrative word 101 in bit locations BL11, BL12, and BL13.

Figure 3:
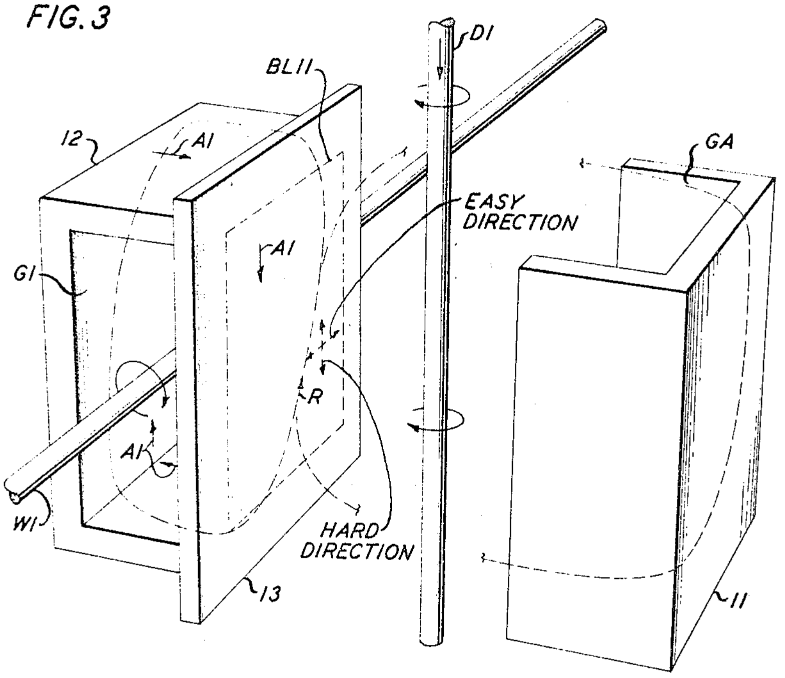
FIG. 3 is a partially exploded schematic view of the portion of FIG. 2.

The magnetic flux in the anisotropic overlay may be assumed to be in a first or second remanent direction along the easy axis which, for illustrative purposes, is taken to be along the direction of the word conductor. The directions of the easy and hard axes are indicated in FIG. 3. A relatively large positive pulse, designated a "word" pulse, is applied to the word conductor W1 under the control of control circuit 17 to drive the flux into the hard direction in the overlay 13 as indicated by the arrows A1 in FIGS. 2 and 3. In this connection, a positive pulse is one wherein current flows from a source. A negative pulse is one wherein current flows toward a source. It may be noticed from FIGS. 2 and 3 that a low reluctance flux closure path or, in other words, a closed flux path is provided through low reluctance plate 12 for the flux in bit location BL11 in overlay 13 in response to the word pulse. As the word pulse is removed a relatively small positive or, alternatively, negative pulse, designated a "digit" pulse, is applied to the digit conductor, under the control of control circuit 17, to tip the "relaxing" flux to a first or second remanent direction along the easy axis. An independent closed flux path is provided through plate 11 for the flux in bit location BL11 in response to the digit pulse as is clear from FIGS. 2 and 3.

As illustrated in FIG. 3, a positive pulse applied to the digit conductor at the termination of the word pulse tips the relaxing flux to the right as viewed in FIG. 3. Similarly, a negative digit pulse tips the relaxing flux to the left. The former may be taken as representing a binary "1"; the latter may be taken as representing a "0."

The aforementioned or a later applied word pulse, in rotating, toward the hard axis, flux in a selected bit location, induces a pulse in the corresponding digit conductor. The induced pulse, negative for a stored binary "1" and positive for a stored binary "0," is detected by detection circuit 16 under the control of control circuit 17.

Since the illustrative memory is word organized, a pulse applied to a word line rotates flux in each bit location therealong. Accordingly, to write the illustrative word 101 into the bit locations BL11, BL12, and BL13, word conductor W1 is pulsed under the control of control circuit 17, and at the termination of the word pulse a small positive tipping pulse is applied to each of digit conductors D1 and D3, and a small negative pulse is applied to digit conductor D2 in the manner described hereinbefore. In response, for example, to a later word pulse, negative pulses are induced in digit conductors D1 and D3 and a positive pulse is induced in digit conductor D2. The pulses are read out in parallel by detection circuit 16. It may be appreciated that in the absence of digit pulses applied as the word pulse terminates, the memory operates in a destructive mode. Both destructive and nondestructive rotational modes of operation are well known in the art, and, accordingly, the operation of the memory is not discussed exhaustively here. It is deemed necessary only to state further that the margin requirements characteristic of word-organized memories apply in the illustrative embodiment and a digit current is, accordingly, of an amplitude below a level which would, by itself, deleteriously effect information stored in nonselected bit locations.

A close examination of FIGS. 2 and 3 reveals that a bit location, that is to say, a portion of the overlay 13 in which information can be stored, has dimensions of the area defined by, for example, intersecting grooves GA and G1 (actually slightly smaller because of edge effects therein). This limited portion is designated, illustratively, BL11 in FIG. 3. In the remainder of the magnetic structure the drive currents do not cause information to be stored or read out because of the presence of only a single conductor there. Accordingly, the magnetic state of the overlay everywhere but at the bit locations is of little consequence and may be neglected.

Also, the overlay is short circuited except at the bit locations by closed flux paths which are provided through base plates 11 and 12 for flux induced by the digit and word pulses, respectively. This is clear from FIGS. 2 and 3 where the field for a positive current in conductor W1 is indicated by a curved arrow directed clockwise about the conductor. Within the bit location, flux designated A1 induced by the current closes through pltae 12 as shown in FIG. 3. Importantly, the base plates and posts are nonsaturating, in accordance with this invention, to provide suitable flux closure for remanent flux in a bit location. Just outside the bit location, however, flux follows the path indicated by the arrows B1 in FIG. 2, finding a closed flux path through plates 11 and 12. A corresponding discussion is applicable to currents applied to a digit conductor. Since the magnetic state of the overlay everywhere but at the bit locations may be neglected, the low reluctance material need be present only at the bit locations. A base "plate," thus, may appear as a plurality of opposed U-shaped structures shown in FIG. 2 rather than as grooved plates.

Similarly, flux closure at a bit location may be impaired if the grooves, for example, GA and G1, are insufficiently deep. For shallow grooves, the field of the drive current, rather than providing flux switching in the bit location may bridge the air gaps, shown in FIG. 2, and close through plate 11. The depth of the grooves is chosen to avoid this effect.

During rotation of flux through any angle, flux closure is provided equally through both plates 11 and 12. This is clear from FIG. 3 where flux at an angle, illustratively selected at about 45 degrees to the easy axis, is represented by an arrow designated R and is shown to close through both plates 11 and 12 by the broken lines connecting arrow R. Thus, high demagnetizing fields, encountered when flux is rotated to an angle for which the conventional waffle iron base plate provides no posts for closure are not encountered in a structure in accordance with this invention. Therefore, the objects of this invention are realized.

In one specific embodiment, two base plates 1.50 inches by 1.50 inches by 0.20 inch, of ferrite, having like permeabilities $\mu$ of 1000 were grooved by well known diamond saw techniques. Substantially parallel grooves were formed in each plate. The grooves were 0.005 inch wide by 0.010 inch deep. Electrical conductors having about 0.004 inch diameters were threaded through the grooves. The grooves of one plate were filled with low melting point glass, a suitable nonmagnetic material, and ground smooth. A thin film of 80 nickel-20 iron, by weight, about 1000 Angstrom units thick was deposited, by conventional evaporating techniques on the smooth surface after suitable cleaning, and the other plate then was clamped into place thereover so that the grooves of one plate were orthogonal to those of the other. Suitable clamping means are well known in the art. Rotational switching speeds of about 10 nanoseconds have been achieved with word currents of about 0.10 ampere and digit currents of about 0.010 ampere.

Thin films useful as overlays in accordance with this invention may be, for example, well known nickel-iron, nickel-cobalt, and iron nickel-cobalt alloys and be of thicknesses in the range of about 500 to 5000 Angstrom units. This is consistent with the requirement of conventional thin film memories. For comparison, thin film memories typically are characterized by word currents of 0.50 ampere and digit currents of 0.10 ampere with switching speeds of 10 nanoseconds.

Figure 4:
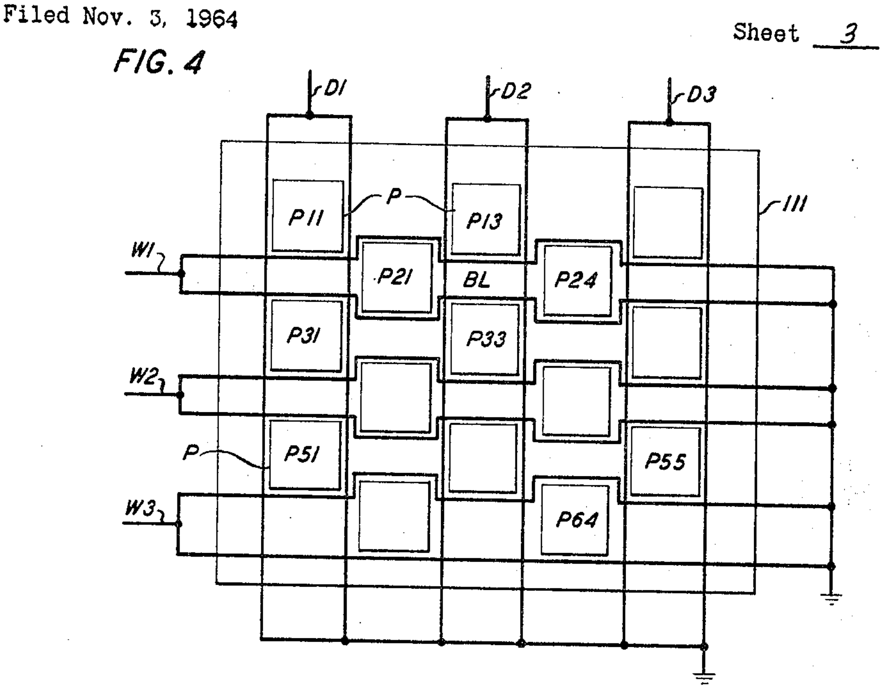
FIG. 4 is a schematic top view of a base plate and drive circuitry for another waffle iron type memory in accordance with this invention.
Figure 5:
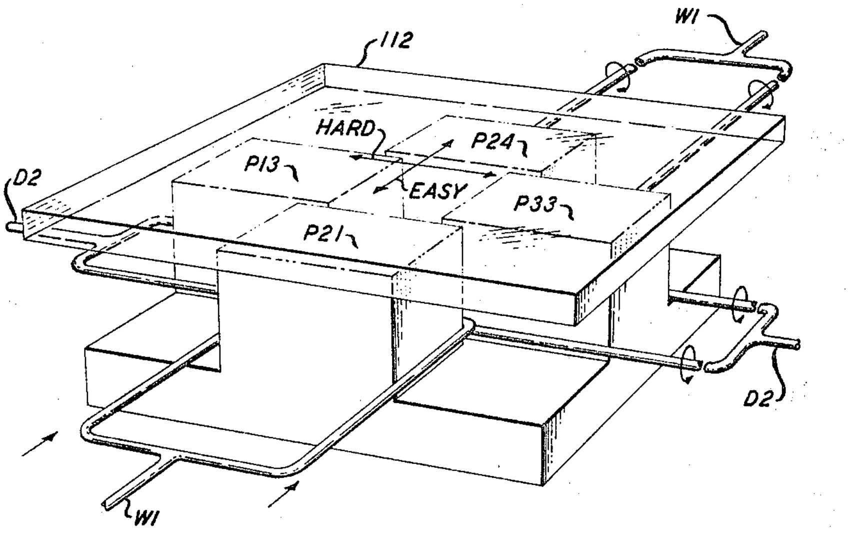
FIG. 5 is an enlarged schematic plan view of a portion of the base plate and circuit of FIG. 4 showing the relationship thereof to the overlay.

Another waffle iron type structure which provides closed flux paths in accordance with this invention is shown in FIG. 4. There an illustrative low reluctance base plate 111 is shown with a plurality of posts P protruding therefrom. The designation for each post includes numerals corresponding to the row and column in which the post is positioned. The structure appears as if every other post in a row and column is missing. Actually, the posts of one row are, to a slight extent, interleaved with the posts of the next adjacent rows to provide overlapping flux closure paths for flux rotated to, for example, 45 degrees in a bit location. The overlay 112 for this structure is indicated in FIG. 5. It is omitted from FIG. 4 for clarity and is to be understood as overlying all the posts P in conventional fashion. Each of a plurality of word conductors W1, W2, and W3 is bifurcated to thread about all the posts of the even numbered rows. For example, the bifurcated word conductor W1 threads about posts P21 and P24, then recombines. The word conductors are connected between a word pluse source (not shown) and ground. The word pulse source as well as a digit pulse source, a utilization circuit, and a control circuit are arranged and function in this embodiment exactly as described hereinbefore in connection with the embodiment of FIG. 1. Accordingly, these elements will not be shown or discussed further at this juncture. The designations used for the word conductors in connection with FIGS. 1, 2, and 3 are also used here to emphasize that the operation of the structure of FIGS. 4 and 5 is as previously explained.

Similarly, digit conductors, designated D1, D2, and D3, are bifurcated and, individually, thread about all the posts of a corresponding odd numbered column. Thus, for example, the bifurcated digit conductor D1 threads about posts P11, P31, and P51, then recombines and is connected to ground. The digit conductors are connected between a digit pulse source (not shown) and ground.

FIG. 5 shows, schematically, a representative bit location of the structure of FIG. 4 including posts P13, P21, P24, and P33. Since operation of this structure is the same as described hereinbefore, discussion thereof will be limited to the extent that only so much thereof will be discussed as is necessary to provide a full understanding of how the closed paths are provided thereby in accordance with this invention. Specifically, a postive current, applied to word conductor W1, in a manner already described, generates a magnetomotive force inducing flux in overlay 112 which closes through post P33, through the base plate, and through post P13. Similarly, a pulse applied to digit conductor D2 induces flux in overlay 112 which closes through post P21, through the base plate, and through post P24. Thus, independent closed flux paths are provided in accordance with this invention. Actually, the closed paths provided by this embodiment share a common portion of the base plate. The closed paths, however, are functionally independent and may be made structurally independent by employing two separate U-shaped structures each having a base portion instead of sharing a common portion. Various post configurations are provided conveniently by ultrasonic cutting techniques well known in the art.

The one further requirement in accordance with this invention is that a closed flux path be provided for flux rotated to any angle in the overlay. This is insured by making the posts sufficiently close together (that is, overlapping) such that flux closure is provided partially by each post when flux is rotated to a direction between posts.

It is to be understood that the specific embodiments of this invention described herein are merely illustrative and that numerous other arrangements according to the principles of this invention may be devised by one skilled in the art without departing from the spirit and scope of this invention.

What is claimed is:

1. In combination, a sheet of anisotropic magnetic material having hard and easy axes, first and second sets of drive conductors for defining a plurality of bit locations in said magnetic material, means including said first set of drive conductors for rotating flux in selected bit locations to a direction along said hard axis, means including said second set of drive conductors for tipping flux in selected bit locations to a selected direction along said easy axis, and low reluctance means at each of said bit locations for providing there first and second independent closed flux paths for the flux induced in said bit locations in response to a current in said first and second drive conductors, respectively, and for providing closed flux paths for flux at any angle in said bit locations wherein said first and second sets of drive conductors are on the same side of said sheet.

2. A combination in accordance with claim 1 wherein said low reluctance means comprises a single low reluctance plate including interleaved rows of posts providing thereamongst grooves for housing said first and second sets of drive conductors.

3. In combination, a sheet of anisotropic magnetic material, a low reluctance base plate having rows and columns of posts thereon juxtaposed with said sheet, the posts of each even numbered row of posts being interleaved with the posts of the next adjacent odd numbered rows to provide therebetween overlapping along the axis of the rows, and first and second sets of drive conductors, each of said drive conductors being bifurcated to thread about all the posts of corresponding even numbered rows and corresponding odd numbered columns, respectively.

References Cited

UNITED STATES PATENTS

| | | | |
|---|---|---|---|
| 3,235,853 | 2/1966 | Luebbe | 340—174 |
| 3,259,888 | 7/1966 | Cornely et al. | 340—174 |
| 3,274,571 | 9/1966 | Bobeck et al. | 340—174 |
| 3,307,161 | 2/1967 | Woods | 340—174 |

BERNARD KONICK, *Primary Examiner.*

P. SPERBER, *Assistant Examiner.*